United States Patent
Kuehnle

Patent Number: 5,863,273
Date of Patent: Jan. 26, 1999

[54] TOROIDAL TRANSMISSION AND METHOD AND APPARATUS FOR MAKING AND ASSEMBLING SAME

[76] Inventor: Manfred R. Kuehnle, P.O. Box 1020, New London, N.H. 03257

[21] Appl. No.: 881,473

[22] Filed: Jun. 24, 1997

Related U.S. Application Data

[63] Continuation-in-part of Ser. No. 711,975, Sep. 10, 1996.

[51] Int. Cl.⁶ .................................................. F16H 55/32
[52] U.S. Cl. ...................................... 475/331; 74/424.8 C
[58] Field of Search ..................................... 475/331, 345, 475/347; 74/424.8 C, 465

[56] References Cited

U.S. PATENT DOCUMENTS

| Re. 26,476 | 10/1968 | Kuehnle . |
| 2,936,646 | 5/1960 | Gould . |
| 3,174,354 | 3/1965 | Kuehnle . |
| 4,297,919 | 11/1981 | Kuehnle ............................ 74/424.8 C |
| 5,435,794 | 7/1995 | Mori et al. ............................... 475/343 |

Primary Examiner—Dirk Wright
Attorney, Agent, or Firm—Cesari and McKenna, LLP

[57] ABSTRACT

A toroidal transmission includes a stator having a plurality of helical races that together define a toroidal cavity having an axis, and first and second shafts rotatable about the axis, the first shaft carrying a worm, the second shaft carrying a plurality of multiple-tooth rotors arranged in a circle about the axis so that the rotor teeth are facing toward the axis and drivingly engage the worm and the rotor teeth facing away from the axis extend into the cavity and drivingly engage the races. The transmission has a first mounting plate having an opening therein receiving the first shaft and a second mounting plate having an opening therein receiving the second shaft, the plates being positioned on opposite sides of the rotors perpendicular to the axis. The stator comprises a circular array of individual arcuate twisted ribs spaced apart about the axis, each rib having one end connected to the first plate and its other end connected to the second plate so that portions of the away-facing rotor teeth project into the spaces between the ribs, which spaces thus constitute the stator races. A method of assembling the transmission is also disclosed as are a method and apparatus for making the transmission's stator.

19 Claims, 6 Drawing Sheets

TOROIDAL TRANSMISSION AND METHOD AND APPARATUS FOR MAKING AND ASSEMBLING SAME

RELAXED APPLICATION

This application is a continuation-in-part of Ser. No. 08/711,975, filed Sept. 10, 1996.

BACKGROUND OF THE INVENTION

This invention relates to a power transmission and to a method of making and assembling the transmission. It relates more particularly to a unique type of mechanical power and motion transmission that operates within a very compact space envelope by causing a radially positioned group of load sharing rotor elements, when driven by a central drive worm, to rotate and precess along a multiplicity of stator races with said races forming collectively a geometric torus.

This transmission can be driven from either side to function either as a speed reducer or speed increaser with equal efficiency. With its coaxial configuration, this transmission is uniquely suited for handling high torque requirements in confined spaces where minimum weight, minimum volume, and low acoustic noise are of premium value. The applications that can be addressed with this transmission are, for example, helicopter rotors, automotive wheel drives, actuators in earth moving heavy equipment, industrial drives, tank sprocket drives, and precision positioning and motion devices.

Over the years, I have developed several power transmissions which incorporate the kinematic principles of the toroidal drive. Those early transmissions are described in detail in my patents 4,297,919 and RE 26,476, among others. Those early efforts were aimed at building highly compact mechanisms whose motion and power transmission capabilities depended, at least theoretically, on the employment of multiple, load-sharing, rotary bearing elements to transmit high torque at high reduction ratios. The fruits of those efforts were relatively compact, lightweight, high-efficiency gear reducers whose additional attributes were high-resistance against shock and geometric coaxiality between input and output.

However, when attempts were made to implement the theoretically possible load sharing abilities and to build those devices in quantity, certain serious limitations appeared such as the impossibility to assemble a full complement of rotors, and the high cost and difficulty in manufacturing some of the elements and severe restrictions with regard to the number of load-sharing bearing elements that could actually be employed in a given transmission to handle large loads on the output shaft. There was an equally serious limitation regarding the practical range of speed ratios that could be achieved between the transmission input and output. More particularly, only transmissions with gear ratios of 36:1 or more could be made as a practical matter.

A transmission of the type described in the first above patent is depicted in FIG. 1. The load-sharing elements in this type of transmission comprise rotor units 10 each of which includes a hub 12, a ring 14 rotatably mounted coaxially to the hub and a plurality of fingers 16 extending radially outward from the ring, the fingers being terminated by drive rollers 18. The rotors 10 are mounted via the hubs 12 to a large ring 20 centered on the common rotary axis of the transmission input and output shafts 22 and 24. The rollers 18 of radially inner fingers 16 of the bearing units engage in the grooves of a worm 26 connected to the input shaft 22 and the ring 20 to which the bearing units 10 are mounted is connected by arms 28 to the output shaft 24.

The outer fingers 16 of the rotor units 10 engage in grooves or races 32 inscribed in the interior of a two-section transmission housing 34. When the drive worm 26 is rotated by the input shaft 22, the various rotor units 10 are caused to rotate about their respective hubs 12. Since the rotors also engage in the stator races 32, rotation of those rotors causes the rotors to advance along the races which, in turn, causes the ring 20 to which the rotor units are attached to precess about the rotary axis of the transmission. Since the ring 20 is connected to the output shaft by arms 28, when the ring 20 rotates, so does the output shaft 24.

FIG. 1 depicts a transmission having six planetary rotor units each of which has six rolling fingers 16. However, it has become obvious that smaller gear ratio transmissions with the toroidal races 32 having generally rectangular cross sections as shown simply cannot be assembled on a production basis with more than three fingers on each rotor unit 10 because of the three-dimensional nature and spatially twisted geometry of the toroidal races 32 that have to be engaged by the rotor units 10.

More particularly, when assembling the transmission, the drive rollers 18 on the radially inner fingers 16 of all of the rotor units 10 must engage the threads of the drive worm 26 and the rollers of the radially outer fingers of the rotor units must simultaneously engage in the helical races 32 inscribed in the stator housing 34. Since the rotor units are more or less flat and the races 32 are spatially twisted or skewed at relatively steep angles, it has proven to be very difficult to locate all of the rotor unit fingers in their respective worm threads and races all at the same time to enable the upper and lower sections of housing 34 to be brought together so as to envelop the rotor units, especially when the transmission incorporates rotor units with more than two rolling fingers.

In other words, the crossover angle between the rotational plane of the rotor unit and associated helical race has to be quite large, leading to a twisted race geometry into which the drive rollers 18 of the multiple rotor unit fingers cannot be inserted during assembly of the device due to that twist. For example, the FIG. 1 transmission having a double-threaded worm 26 and six rotor units 10 each having six fingers 16 has a gear ratio of 12:1 and the rotor units rotate four times for each revolution of the output shaft 24. The helical races 32 of this 12:1 design possess such steep lead angles that the drive rollers 18 on all of the planar rotor units simply cannot be inserted into the races during assembly of the transmission due to mechanical obstructions.

Thus, the practical gear ratio restrictions imposed on those early toroidal transmissions limited their field of use as a torque-capable transmission.

To alleviate some of the above problems, a new transmission and mode of assembling same was developed and is the subject of the aforementioned pending application, the contents of which is hereby incorporated herein by reference. That transmission, like the one in FIG. 1, has two stator halves in two housing sections, i.e., each stator groove or race is split across the middle. The internal finger rollers of the transmission are assembled through special access holes provided in the groove bottoms or by fabricating the stator halves out of multiple segments arranged in the two housing sections.

To assemble that transmission, the input and output shafts are rotatably coupled together and the rotor units are mounted to the arms of the output shaft such that the drive rollers on the radially inwardly facing rotor fingers engage the central worm. At this time, however, the radially outwardly facing rotor fingers are devoid of drive rollers.

Next, the two housing sections are engaged together so that they envelop the rotor units. Only then are the drive rollers for the radially outwardly facing rotor fingers attached to those fingers through specially placed access holes provided in the two housing sections which lead from the bottoms of the stator races to the outside.

By rotating the input shaft, the end of each rotor finger may be positioned opposite one or another of the access holes so that the drive roller for that finger may be inserted through the hole and fastened to the end of that finger.

However, as noted above, that transmission is still disadvantaged by having split stator races which cause wear, vibration and noise when the transmission is in operation as the rotor drive rollers roll across the splits. Also, it has proven difficult to form the helical stator races in the usual way by "plowing" or cutting material from blocks of metal in a three-dimensional machining operation.

Still further, due to the aforesaid closed stator construction, that prior transmission is relatively heavy and bulky and requires internal lubrication to prevent the rotors and other internal parts from overheating.

As a result, these are some applications for which that transmission may not be suitable.

SUMMARY OF THE INVENTION

Accordingly, the present invention aims to provide a toroidal power and motion transmission which may have a gear ratio within a wide range, e.g., 12:1 to 100:1 combined with high torque capability, yet which is relatively easy to make and to assemble.

Still another object is to provide a toroidal transmission which produces minimal vibration and acoustic noise when in operation.

A further object of the invention is to provide a toroidal transmission which has no split lines in its stator grooves.

Another object of the invention is to provide a transmission of this type which may be light in weight and compact.

Yet another object is to provide a toroidal transmission which may be air cooled for high speed applications or sealed with internal lubrication.

Another object of the invention is to provide a toroidal power transmission whose stator is relatively easy to mass produce with precision.

Yet another object is to provide such a transmission which allows for ready visual inspection of, and access to, the internal components of the transmission.

A further object is to provide an improved method of assembling a toroidal transmission.

Another object is to provide a method of making a toroidal transmission whose stator races are formed by a circular array of individual, spatially curved stator segments or ribs.

Still another object of the invention is to provide apparatus for making a transmission composed of a toroidal array of individual ribs.

Other objects will, in part, be obvious and will, in part, appear hereinafter. The invention accordingly comprises the several steps and the relation of one or more of such steps with respect to each of the others, and the apparatus possessing the features, properties, combination of elements and arrangement of parts, which are exemplified in the following detailed description, and the scope of the invention will be indicated in the claims.

Briefly, this toroidal transmission comprises a stator that defines a plurality of generally parallel, helix-like races forming a geometric torus having a closed, ring-shaped circular axis. A plurality of axles that are fixedly spaced-apart and mounted as part of a central, fully extended, high torque output shaft located centrally in the stator hold a plurality of rotors that are rotatably mounted to the axles. These rotors have rolling teeth or fingers, each tooth of each rotor being in engagement with a different one of the stator races. A low torque input shaft extends into the output shaft perpendicular to the circular torus axis and has a worm gear, usually of split design, centered between the rotors and meshing with all the adjacent teeth of the contiguous rotors. The high torque output shaft that coaxially envelops the input shaft provides external connectability.

It is a feature of the invention that the stator races are not cut into blocks of material as was done heretofore. Rather, the races are formed by a circular array of individual arcuate twisted ribs. The opposite ends of the ribs have locating surfaces which are keyed to mounting plates at the opposite ends of the transmission to form an open cage-like structure that allows unrestricted visual and mechanical access to the rotors.

Each rib has precision working surfaces on two sides which guide the rolling teeth or fingers of the rotors. In other words, the stator races have no bottoms. Each rolling tooth may move along the slit or gap between adjacent ribs of the stator, being guided by the opposing working surfaces of those ribs. Since the ribs have no splits along their lengths, the present transmission produces minimal vibration and noise when in use.

The open stator construction also minimizes the overall weight of the transmission and allows air to circulate within the transmission to reduce the chances of the unit overheating.

The individual arcuate ribs which comprise the stator can be made relatively easily from forgings or castings whose working and locating surfaces may be finished using a properly programmed multi-axis milling grinding/polishing tool. As will be described in detail later, during the rib fabrication process, the precise geometry of the precision working surfaces of the ribs is precisely referenced to the locating surfaces at the ends of the ribs. Also, the upper and lower mounting plates for the ribs are formed with precisely located radial seating positions for the ribs. Therefore, when the transmission is assembled, the ribs collectively automatically define the correct toroidal stator paths for the rotors to follow when the transmission is in operation.

To assemble the transmission, the full complement of rotors is mounted to the output shaft that already contains the input shaft and central worm. The rotors are positioned in slits formed at fixedly spaced apart radial locations on the output shaft so that each rotor has one or two radially inwardly facing rolling teeth engaging the central worm. The remaining, outwardly facing rotor teeth are exposed.

Next, the upper and lower mounting plates are engaged from above and below to that assembly. Only then are the stator ribs mounted one by one to the two mounting plates. For this, the central worm may be rotated by rotating the input shaft to orient the rotors so that the ribs can be seated at their proper locations on the mounting plates, i.e., so that the correct outwardly facing rotor teeth lie in the slit or gap being created by the addition of each rib to the assembly.

Thus, the invention allows a standard input/output shaft assembly to be used in numerous stator configurations with a wide ranging number of grooves, provided that the radial position angles of the rotors on the output shaft conform to certain mathematical placement requirements between worm lead angles and stator lead angles.

In sum, then, in this improved toroidal transmission, the required compendium of stator races may be formed by aggregating numerous radial stator segments into an open cage-like configuration. The advantage of this approach resides in the ability to inexpensively cast or otherwise form individual stator ribs or segments in the required arcuate twisted shape and geometry and then to perform a precision machining operation on the exposed working and locating surfaces of the ribs and a precision assembly operation that fixes each rib accurately at the required positions on the mounting plates. Further, weight reductions can be achieved by casting the stator ribs or segments as hollow parts.

After the transmission is assembled, the rotor teeth may be visually inspected and are readily accessible through the bottomless stator races in the event they have to be repaired or replaced.

BRIEF DESCRIPTION OF THE DRAWINGS

For a fuller understanding of the nature and objects of the invention, reference should be had to the following detailed description taken in connection with the accompanying drawings, in which.

DESCRIPTION OF THE PREFERRED EMBODIMENTS

Figure 1:
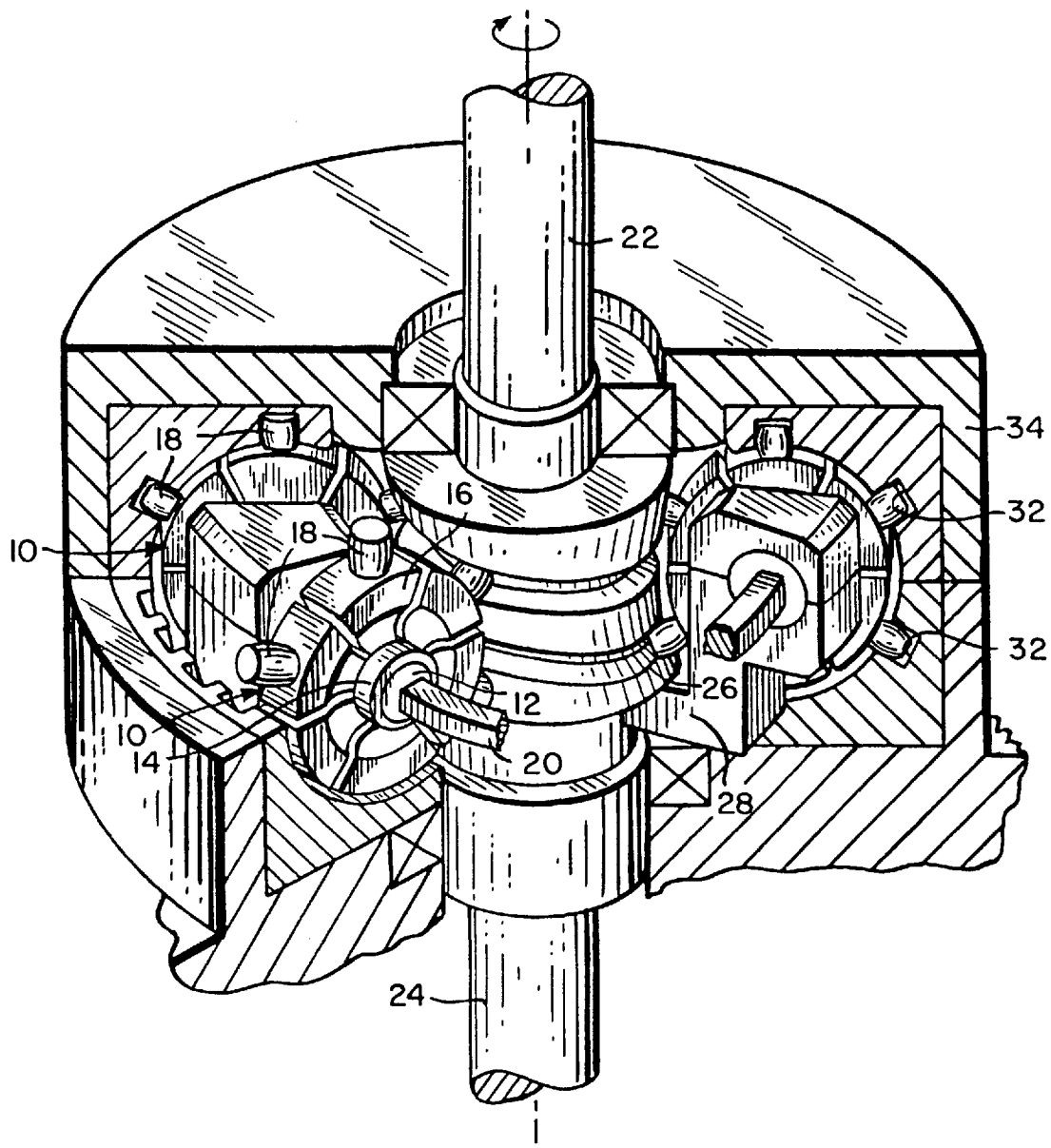
FIG. 1 already described, is a perspective view partially broken away of a conventional toroidal power transmission.
Figure 2:
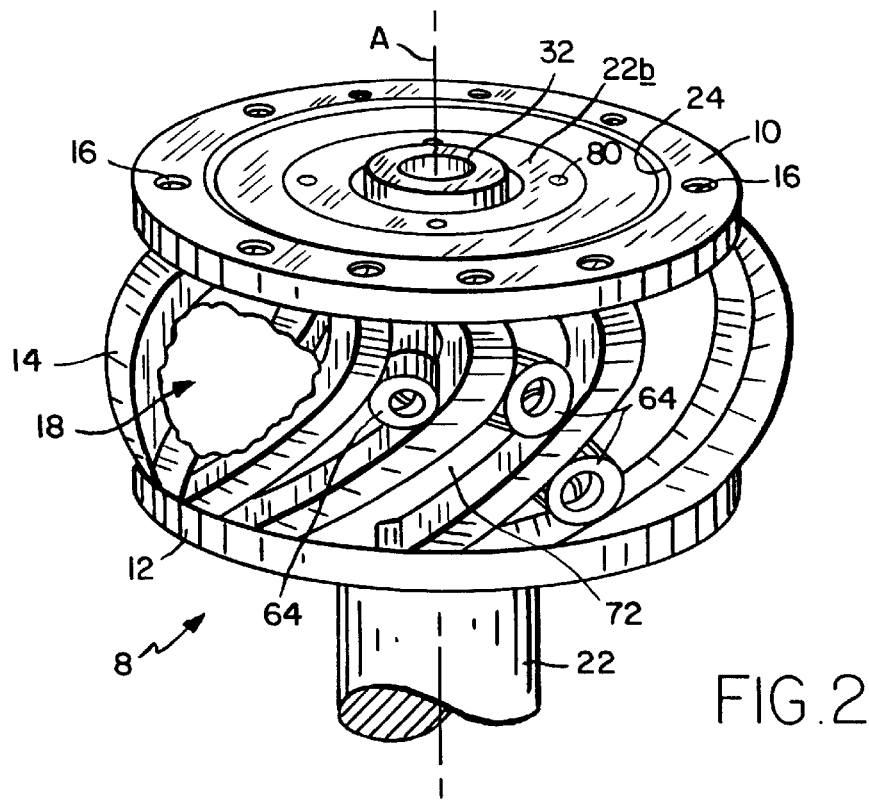
FIG. 2 is a perspective view on a smaller scale of a toroidal power transmission incorporating the invention.
Figure 3:
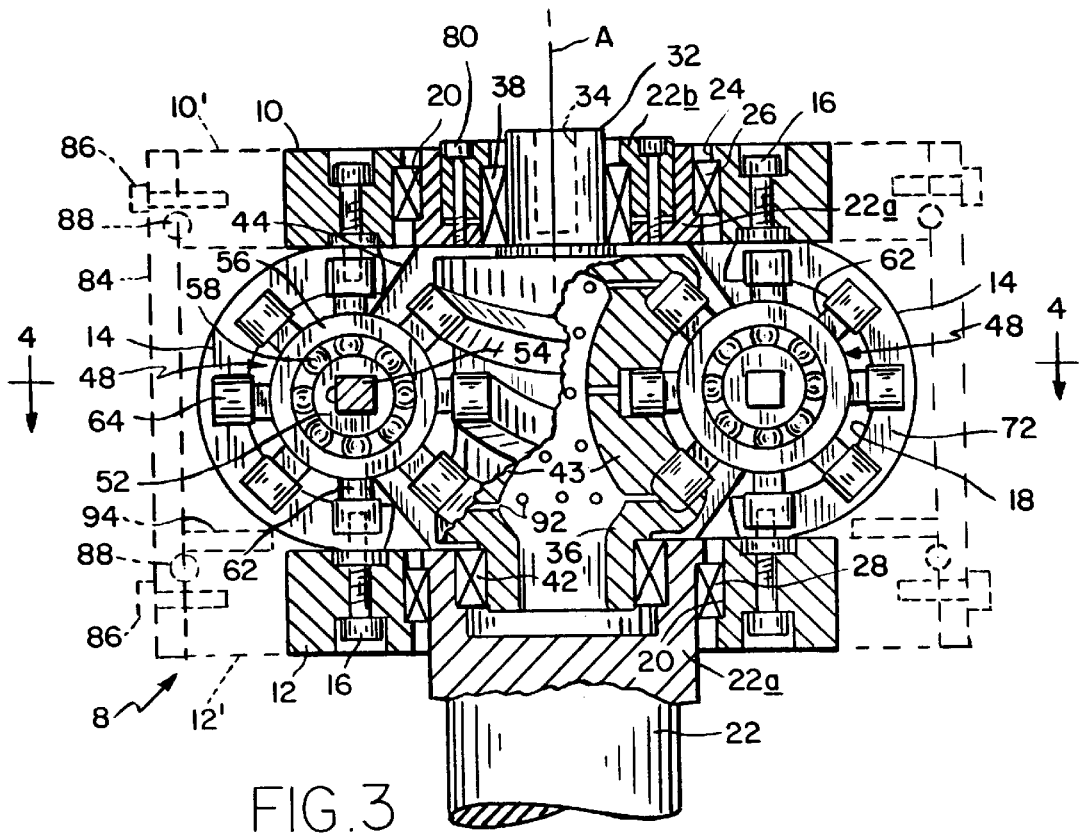
FIG. 3 is a vertical sectional view with some parts shown in elevation of the FIG. 2 transmission.

Referring now to FIGS. 2 and 3 of the drawings, my transmission, shown generally at 8, includes a first, herein upper, annular mounting plate 10, a second, herein lower, annular mounting plate 12 and a plurality of specially shaped stator ribs 14 extending between plates 10 and 12. The opposite ends of each rib 14 are connected to mounting plates 10, 12 by threaded fasteners 16 so as to form an open, cage-like structure that defines an internal toroidal cavity 18 which has a circular axis C FIG. 4) centered on the transmission axis A.

Extending up through a central opening 20 in bottom plate 12 is an output shaft 22 centered on axis A. Shaft 22 has an enlargement 22a which projects up within cavity 18 to a central opening 24 in the top mounting plate 10. The plate openings 20, 24 and shaft 22 are stepped to accommodate suitable cone bearing units 26 and 28 adjacent the top and bottom, respectively, of shaft extension 22a. The bearing units 26, 28 rotatably mount shaft 22 to the upper and lower mounting plates 10, 12 and absorb thrust imposed on that shaft during operation of the transmission.

Positioned coaxially within shaft extension 22a is an input shaft 32. The upper end of shaft 32 is more or less even with the top of mounting plate 10. Also, a passage 34 having a longitudinally slotted sidewall extends down into that end of shaft 32 for coupling the input shaft 32 to a rotary input device such as a motor. Shaft 32 extends down into the shaft enlargement 22a all the way to the lower mounting plate 12 and an axial passage 36 extends up from the lower end of shaft 32 almost to the upper passage 34 therein. Thus, shaft 32 is essentially hollow to minimize weight.

Upper and lower end segments of shaft 32 and the adjacent segments of the enlargement 22a are stepped to accommodate upper and lower cone bearing units 38 and 42 to enable shaft 32 to rotate about axis A relative to shaft 22 and to absorb the thrust imposed on the former shaft.

Figure 5:
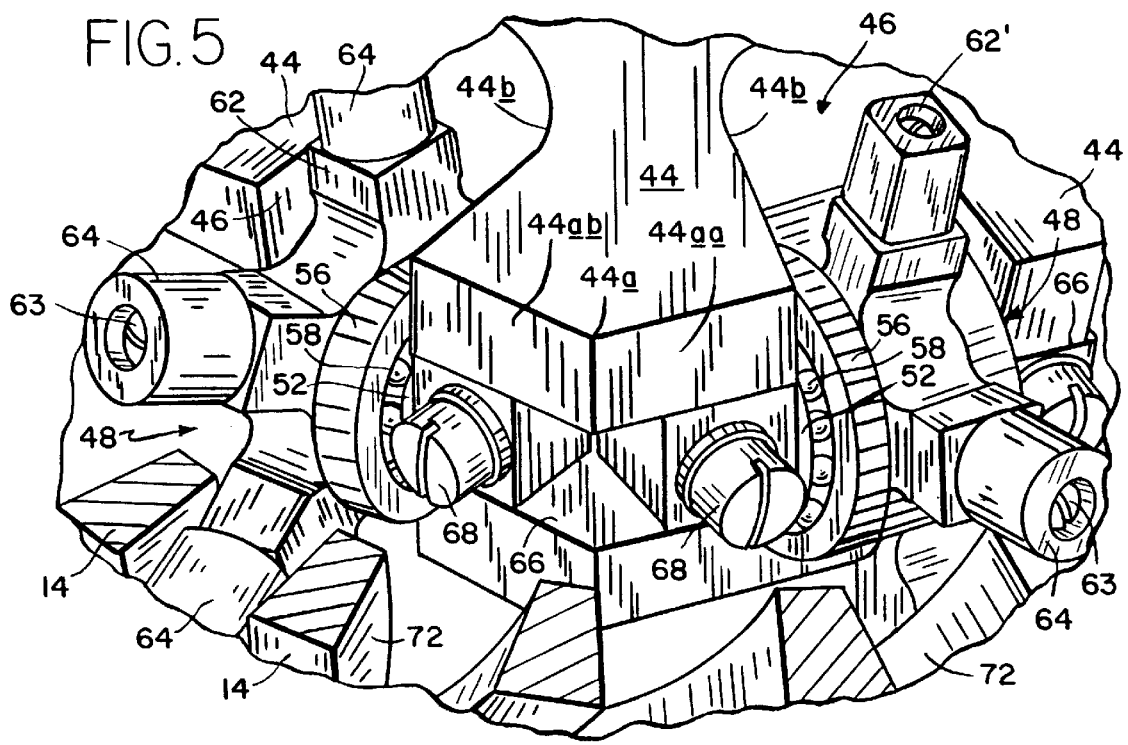
FIG. 5 is a fragmentary perspective view on a larger scale showing certain internal components of the FIG. 2 transmission in greater detail.
Figure 4:
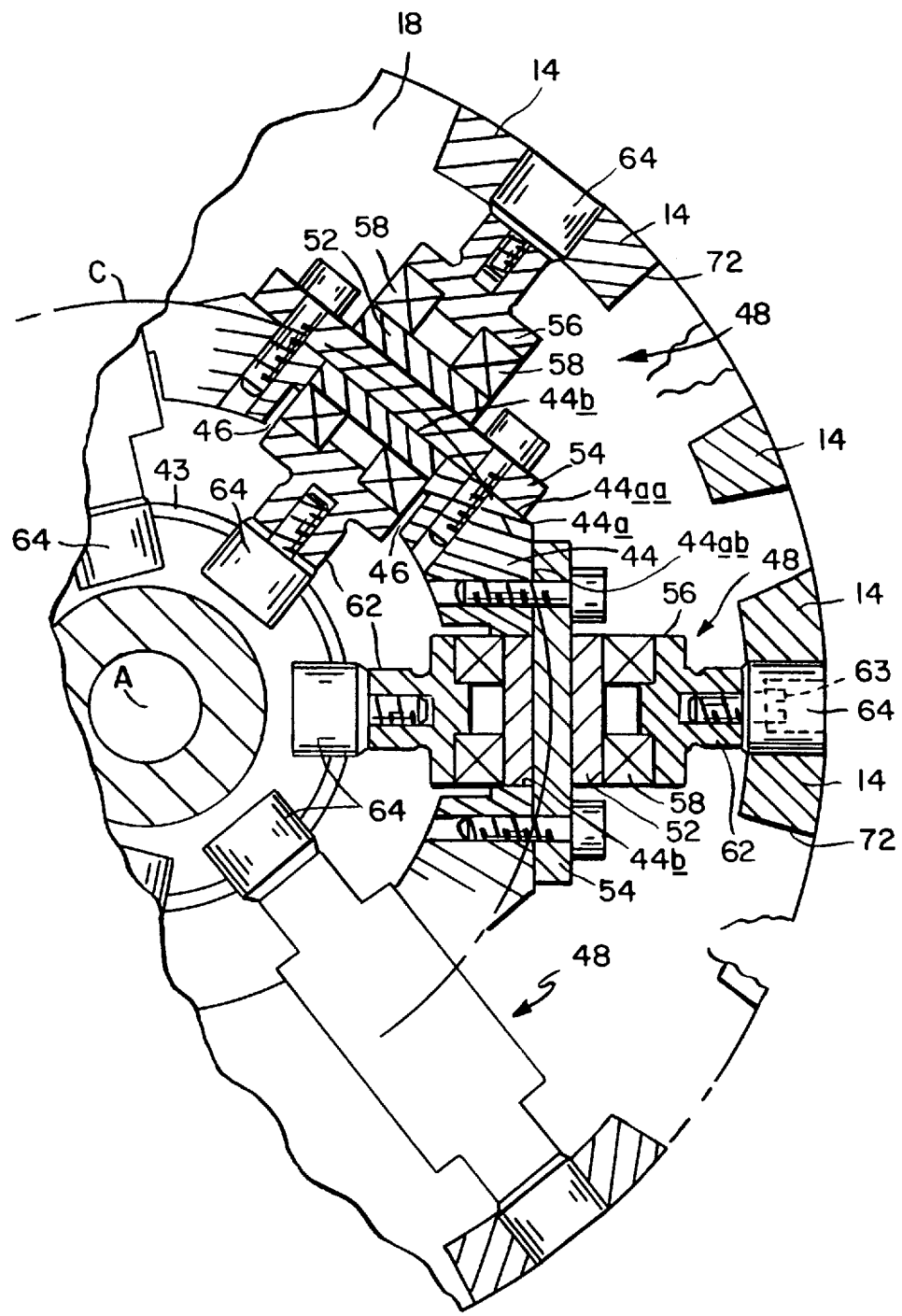
FIG. 4 is a sectional view taken along line 4—4 of FIG. 3.

As best seen in FIGS. 3 to 5, shaft 32 carries an hourglass-shaped, double-threaded central worm gear or worm 43 which is centered on axis A opposite the toroidal cavity 18 within ribs 14. Also, present on shaft extension 22a between cavity 18 and worm gear 42 is a circular distribution of radially extending ears 44 which project out toward cavity 18, the ears being separated by radial slots 46. The radially outer faces 44a of ears 44 are flat and extend parallel to axis A as shown in FIGS. 4 and 5. Actually, as seen from FIG. 5, the radially outer surface 44a of each ear 44 has two facets 44aa and 44ab, each facet being parallel to axis A. Also, the opposing radial side surfaces 44b of adjacent ears 44 defining the slots are flat and parallel to one another as well as to axis A as best seen in that same figure.

The ears 44 of output shaft 22 are designed to support a plurality of load-sharing rotary elements or rotors shown generally at 48 which fit into the slots 46, there being one rotor 48 located in the slot between each pair of adjacent ears 44. As best seen in FIG. 4, the axes of rotation of all of the rotors 48 are located on the circular axis C of the toroidal cavity 18.

Each rotor 48 comprises a hub 52 which encircles an axle 54 having squared off ends which project from opposite sides of the hub. Concentric to hub 52 is a radially outer shell or ring 56 which is separated from the hub by bearings 58 so that the shell is free to rotate relative to hub 52 and axle 54. Formed integrally with shell or ring 56 is a circular array of radially extending fingers or teeth 62 which are equally spaced apart around the perimeter of ring 56. Rotatably mounted to the outer end of each tooth by a threaded fastener 63 is a drive roller 64 which can rotate about the longitudinal axis of the associated tooth. Rollers 64 may be needle bearings or sleeve bearings.

The illustrated rotors 48 each have eight teeth. However, rotors with more or fewer teeth may be used depending upon the gear ratio designed for the particular transmission, as described in my patent 4,297,919.

As shown in FIGS. 4 and 5, the rotors 48 are positioned in the radial slots 46 between adjacent ears 44 such that the opposite square ends of each rotor axle 54 seat in lateral channels 66 formed in the coplanar outer wall facets 44ab, 44ab of adjacent ears 44. In other words, a lateral channel 66 is formed on each facet 44aa and 44ab of each ear 44 to help support the axles of two adjacent rotors 48. The rotor axles 54 are clamped to their respective ears 44 by threaded fasteners 68 extending through a transverse passage in the axle and threaded into ear 44 at the bottom of each channel.

Referring to FIGS. 3 and 4, the drive rollers 64 of each rotor 48 that face radially inward toward worm 43 interfit therewith so that rotation of the worm in one direction or the other about axis A causes rotation of the rotors 48 in unison in one direction or the other about their respective axles 54 which lie on the circular axis of the toroidal cavity 18. On the other hand, the drive rollers 64 located within toroidal cavity 18 are arranged to roll in an array of parallel, helix-like slits or races 72 that exist between ribs 14. Thus, the races 72 form a multiple thread system which is interrupted to accommodate the shaft enlargement 22a and the rotors 48 supported by that enlargement. In other words, the slits or races 72 turn back on themselves to form continuous helical paths for the rotor drive rollers 64, with the rollers of each rotor rolling along in a different one of the races 72.

Thus, when the rotors 48 are rotated in unison by the worm 43, the rotors will revolve or precess in unison about axis A, carrying with them the output shaft 22 to which they are attached by ears 44. Alternatively, the input torque can be applied to shaft 22 and the output taken from shaft 32. In other words, the transmission may transmit torque in either direction.

One of the main differences between the present transmission and the one described in the above-identified copending application is the open, cage-like stator construction mentioned briefly above. Instead of inscribing the races 72 in one or two blocks of material, the races are defined by the circular array of individual ribs 14 which extend all the way between the upper and lower mounting plates 10 and 12.

Figure 6A:
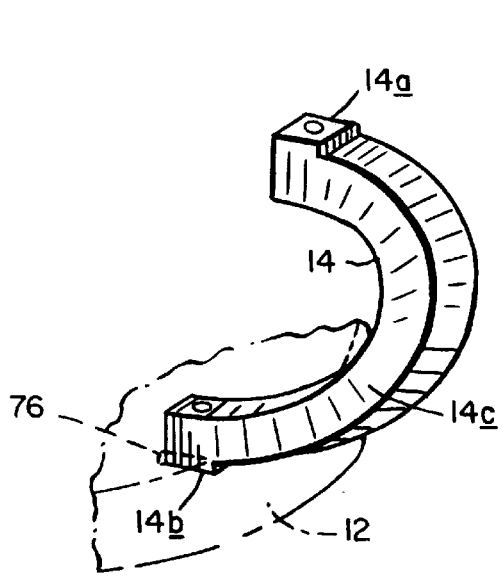
FIG. 6A is a right front perspective view of a typical stator rib in the FIGS. 2 and 3 transmission.
Figure 6B:
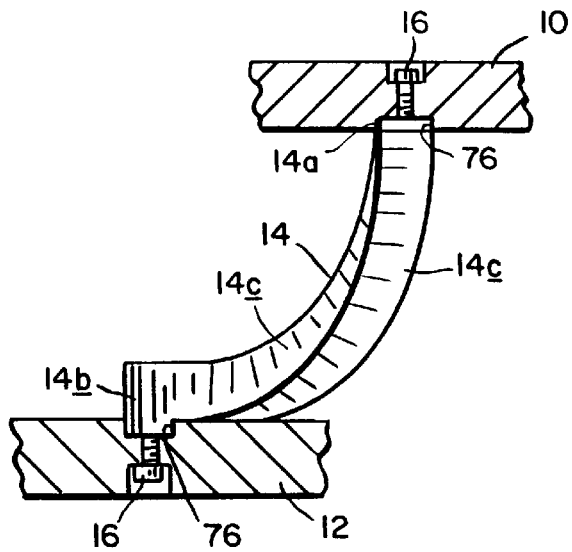
FIG. 6B is a front perspective view thereof.

As best seen in FIGS. 6A and 6B, each rib 14 is a semi-circular arcuate member which is twisted from end to end to form a helical convolution segment. A flat locating surface 14a is provided on the top of the rib adjacent the upper end thereof and a similar locating surface 14b is provided at the bottom of the rib adjacent the lower end thereof. The locating surfaces 14a 14b of each rib 14 are designed to seat against the adjacent surfaces of the upper and lower mounting plates 10, 12, respectively. Preferably, the rib ends are keyed to those plates to accurately fix the positions of the ribs relative to the plates. For example, as best seen in FIG. 6B, opposing surfaces of plates 10 and 12 may be provided with arrays of radial mounting beds or slots 76 in which the upper and lower ends of ribs 14 may be seated to properly locate and orient the ribs relative to the plates and to each other. The rib ends may be anchored in those slots by the threaded fasteners 16.

Instead of keying the ribs to the plates, the ribs may be positioned properly relative to the plates by dowels on the rib ends which project into holes in the plates (or vice versa). Still referring to FIGS. 6A and 6B, the opposite side surfaces 14c of each rib 14 form one side wall each of a pair of adjacent slits or races 72. Therefore, only these sides of the ribs have to be precision working surfaces to allow the drive rollers 64 to roll along the races with minimum friction when the transmission is in operation.

When all of the ribs 14 are secured to mounting plates 10, 12 they form a cage-like structure shown in FIG. 2 which encloses the worm 43 and the rotors 48 and defines the races 72 for the rotor drive rollers 64. This open structure allows air to circulate within the transmission so as to cool the transmission parts. It also permits visual and mechanical access to the rotors 48 and other internal components of the device. Thus those components may be inspected periodically. Also, various optical and/or electrical sensors may be positioned to monitor those components for excessive temperature, wear, etc. If one or more drive rollers 64 do have to be replaced, that may be done through the bottomless races 72 without having to disassemble the transmission.

Permanent access is also had to the precision working surfaces 14c so that for quality control purposes, measuring instruments may be employed to compare a point on a rib working surface, as denoted by a contact sensor, with an ideal position in three-dimensional space stored in a computer database.

The ribs 14 may comprise metal forgings or castings which can then be machined to form the precision surfaces 14a to 14c. A programmable multi-axis milling/grinding/polishing tool may be used for this purpose so that the geometry of the running surfaces 14c are related precisely to the locating surfaces 14a, 14b which are, in turn, referenced to the mounting beds 76 on mounting plates 10, 12.

In some applications, the ribs may be formed as hollow or open structures to minimize weight, and they may be made of an engineering plastic, such as Torlon brand plastic material, which can withstand high loads and bending forces.

Thus, in the present transmission, the ribs 14, which define the stator races 72, have relatively accessible surfaces because the races have no bottoms. This grooveless design of the stator enables a multi-access machine tool to be used in which the ribs can be mounted and exposed to the cutting tool itself. While moving through three-dimensional space for each cutting position, the cutting tool may be guided digitally according to a suitable software program to remove material from the working surfaces 14c in accordance with the mathematical/geometrical requirements of the toroidal geometry of the stator. Because of the rib-like structure, the precision surfaces on each rib are readily accessible thereby removing size restrictions from the cutting tool, such as diameter limitations. Also, the machining of the locating surfaces 14a, 14b is done with relation to the mounting positions 76 on the upper and lower mounting plates 10, 12 that are used to position the ribs in radial fashion to define the transmission's toroidal cavity 18.

To assemble the present transmission, an assembly method is used which is essentially a reversal of those used heretofore. More particularly, first, input shaft 32 and worm 43 with bearing units 38 and 42 are seated in the radial enlargement 22a of output shaft 22. To facilitate this, a radially inner, annular portion 22b of that enlargement at the top of the transmission may be separable from the remainder of the enlargement. After shaft 32 is installed, the annular portion 22b may be seated on the shaft enlargement 22a and retained there by a circular array of threaded fasteners 80.

The rotors 48 are then mounted between the ears 44 of the output shaft by the fasteners 68 so that the radially inwardly facing drive rollers 64 are in engagement with the central worm 43. At this point in the assembly, the radially outwardly facing drive rollers 64 are fully exposed.

Next, the lower mounting plate 12 with bearing unit 28 is engaged against shaft enlargement 22a from below and plate 10 with its bearing unit 26 is seated on input shaft 32 from above.

Only then is the final and most important step in the assembly carried out, namely to position and fasten the individual stator ribs 14 one by one between the mounting plates 10 and 12. For this, the upper and lower rib locating surfaces 14a and 14b are seated in the corresponding locating beds 76 in the opposing faces of the mounting plates 10, 12 and secured there by fasteners 16. When installing each rib, the input shaft 32 may be turned to rotate rotors 48 so as to position one of the rotor drive rollers 64 in the race 72 being bounded by that rib.

In some applications it may be desirable that the rotors 48, including their drive rollers 64 as well as bearings 26, 28, 38 and 42 be lubricated continuously. In this event, the end plates 10 and 12 may have larger diameters as shown in phantom at 10' and 12' in FIG. 3. A peripheral wall 84 may surround those plates thereby fully enclosing the ribs 14 and the wall 84 may be retained in place by fasteners 86 threaded into edges of the end plates. Suitable O-rings 88 may be provided at the boundaries between the wall 84 and the end plates so that the wall and end plates form a fluid-tight housing around ribs 14 which may be partially filled with a light lubricating oil.

When the transmission is in operation, the oil will be circulated by the precessional action of rotors 48. In other words, as the rotors turn, the dynamic rotor teeth dip down into the oil reservoir at the lower half of the drive and transfer lubricant to every race or thread of the stator and worm as the rotors 48 precess around the toroidal cavity 18.

Even further lubrication effects may be achieved by providing small radial passages 92 in the wall of worm 43 on input shaft 32 as shown in FIG. 3. These passages lead from the axial passage 36 in the input shaft to the worm grooves and thus to the rotor drive rollers 64 engaged in those grooves. When the input shaft 34 is rotated, centrifugal force causes the oil pool at the bottom of passage 36 to climb the wall of the passage and flow out through passages 92 to the drive rollers.

In this sealed version of the transmission, it may be desirable to provide means for collecting metal particles that are produced as a result of wear, breakage, e.g., of the drive rollers 64, to prevent those particles from causing further damage to the device. Such means in the form of a magnetic ring are shown in phantom at 94 in FIG. 3, the ring being mounted to the extended lower mounting plate 12'. During operation of the transmission, the circulating lubricating oil carries the metallic debris to the vicinity of the magnet 94 which attracts and collects the debris at a location in the housing well away from the moving components of the transmission.

As a direct result of its compactness and high torque carrying capability and wide range of gear reduction ratios, my transmission can be used in many applications such as to rotate radar antennas, boat propellers, helicopter rotors, etc.

Figure 7:
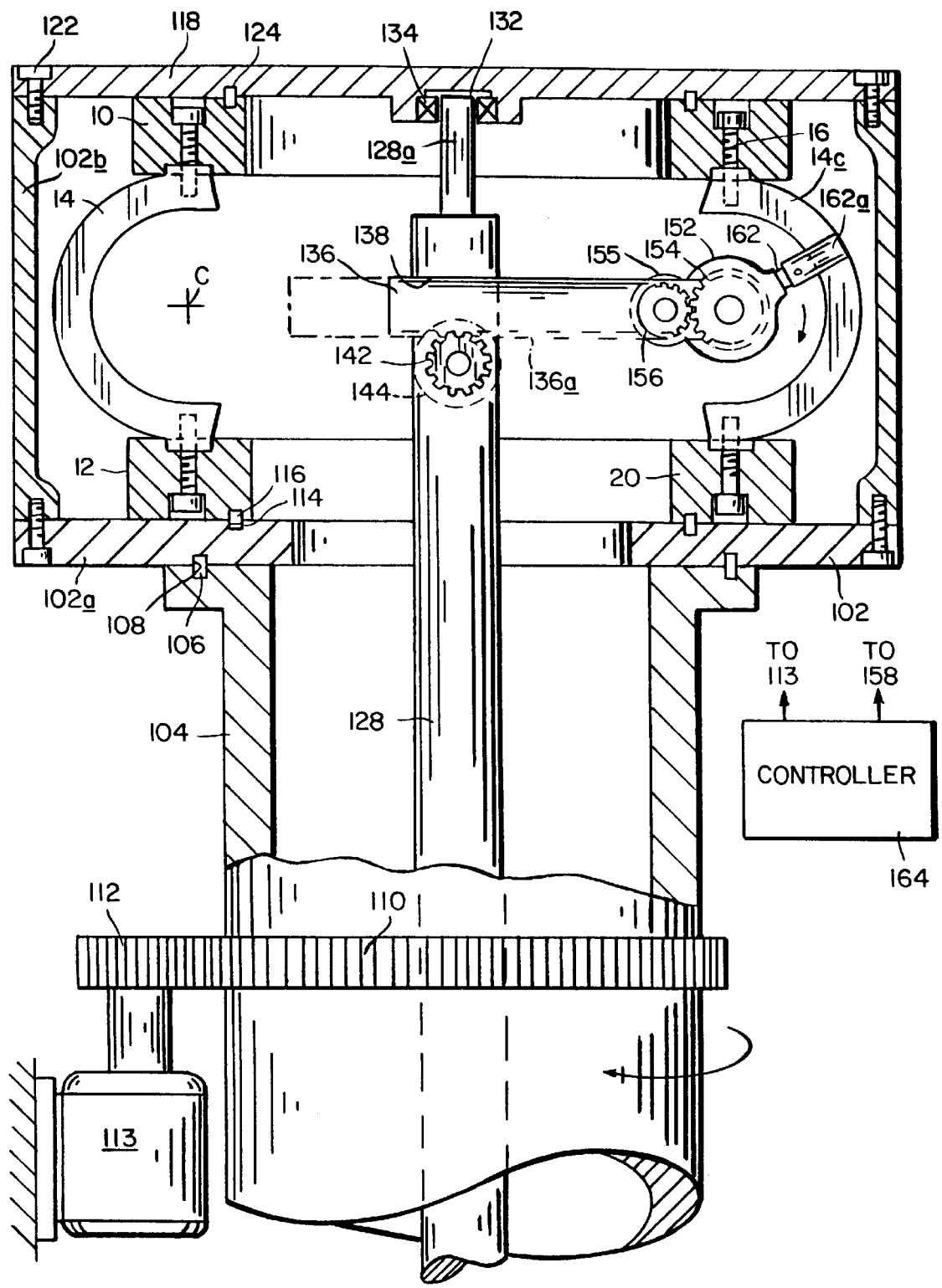
FIG. 7 is a vertical sectional view of apparatus for forming the stator races in the FIG. 2 transmission.

Refer now to FIG. 7 which illustrates an embodiment of apparatus for forming the precision working surfaces 14c on ribs 14 that define the stator races in the FIG. 2 transmission 8. The apparatus comprises a bucket-type housing or turntable 102 having an annular bottom wall 102a and a cylindrical sidewall 102b. The housing is removably mounted to the top of a vertical tubular pedestal 104 which is supported for rotation about the axis A by a base (not shown). In the illustrated apparatus, the housing is rotatably coupled to pedestal 104 by a circular array of locating pins 106 extending down from housing bottom wall 102a into a corresponding array of holes 108a provided in the top of pedestal 104. Thus when housing 102 is seated on the pedestal, it is rotatably fixed thereto.

Pedestal 104 carries a circumferential gear 110 which meshes with a spur gear 112 which may be rotated by an electric motor 113 mounted to appropriate support structure.

The housing 102 is arranged to contain the stator assembly of the transmission 8 depicted in FIG. 2. That assembly consists of upper mounting plate 10, lower mounting plate 12 and the ribs 14 secured between the plates by the fasteners 16 so as to form the toroidal cavity 18. In this case, however, the ribs 14 are without their precision working surfaces 14c. In other words, the ribs are cast or formed parts which have been provided with their locating surfaces 14a and 14b so that they mate with the mounting plates 10 and 12, but which have not been ground and polished to their final form.

The stator assembly may be seated in the housing 102 so that a circular array of locating pins 114 extending up from the housing bottom wall 102a project into a corresponding circular array of holes 116 in the underside of lower mounting plate 12. Thus, when the stator assembly is seated in housing 102, it is rotatably fixed to the housing.

Preferably, housing 102 is provided with a cover 118 which may be secured to the top of the housing by bolts 122 threaded down into the upper edge of the housing sidewall 102b. If desired, cover 118 may be provided with a circular array of depending locating pins 124 designed to project into holes 126 in the top of the transmission's upper mounting plate 10 to further secure the stator assembly within the housing.

Extending coaxially within pedestal 104 is a shaft 128 which projects above the pedestal. The upper end of shaft 128 is terminated by a smaller diameter stub 128a which, when housing 102 is seated on pedestal 104, projects into a collar 132 recessed into the underside of the housing cover 118. Collar 132 is mounted to the cover by way of a bearing unit 134 so that the upper end segment of the shaft is centered on the axis of rotation A of pedestal 104 and the housing 102 and stator assembly supported thereby.

Slidably mounted to shaft 128 near the upper end thereof is a beam 136 which slides in a lateral slide 138 formed in the shaft. Beam 136 extends perpendicular to axis A at a height corresponding to the location of the circular axis C of the stator assembly's toroidal cavity 18. Furthermore, beam 136 is formed with a rack 136a along its length which meshes with a spur gear 142 on shaft 128 and which may be rotated by a reversible electric motor 144 also mounted to the shaft. Beam 136 may be moved laterally from an extended position shown in solid lines in FIG. 7 in which the outer end of the beam extends beyond the circular axis C of cavity 18 to a retracted position shown in phantom in that same figure wherein the beam is located within the diameter of the opening 20 in the lower mounting plate 12 of the stator assembly. Thus, when the beam is in its retracted position, it can pass through the opening 20 when the housing 102 is being positioned on or removed from pedestal 104.

Still referring to FIG. 7, a barrel-shaped tool support 152 is rotatably mounted to the outer end of beam 136. Support 152 is coupled to a spur gear 154 which meshes with a smaller spur gear 156 on beam 136 which is driven by an electric motor 158 also mounted to that beam. When the beam 136 is in its extended position, the common axis of rotation of the tool support 152 and gear 154 is located on the circular axis C of cavity 18.

Support 152 supports an electric grinding or polishing tool 162 having a working end 162a arranged to be positioned against the sidewalls of ribs 14. A controller 164 is programmed to control motor 113 which rotates pedestal 104 about axis A and the motor 158 which rotates the tool support 152 about axis C (in the directions shown by the curved arrows), so that the tool end 162a follows a precise helical path to form each precision working surface 14c of each rib 14, all of which programmed working surface paths are referenced to the positions of the rib locating beds 76 in the upper and lower mounting plates 10 and 12 that are stored in the controller's memory.

Figure 8A:
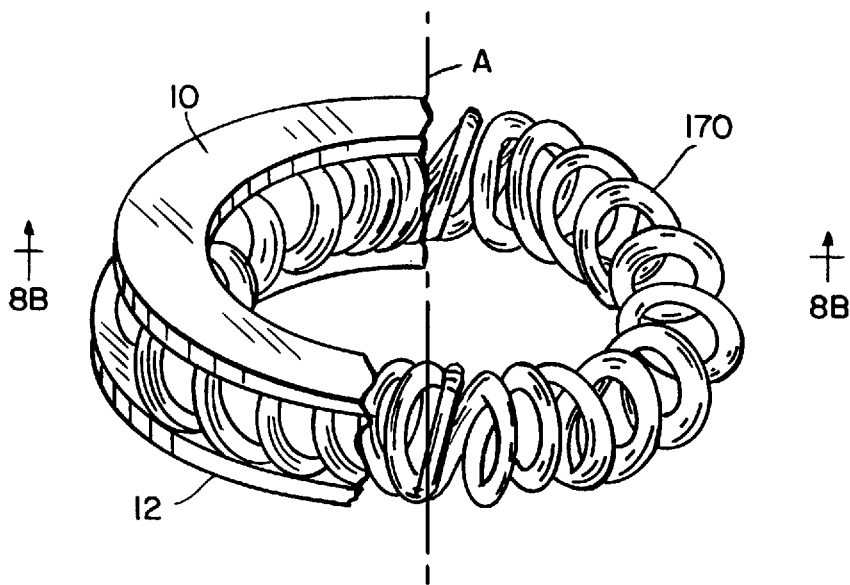
FIG. 8A is a perspective view with parts broken away of another transmission stator embodiment.
Figure 8B:
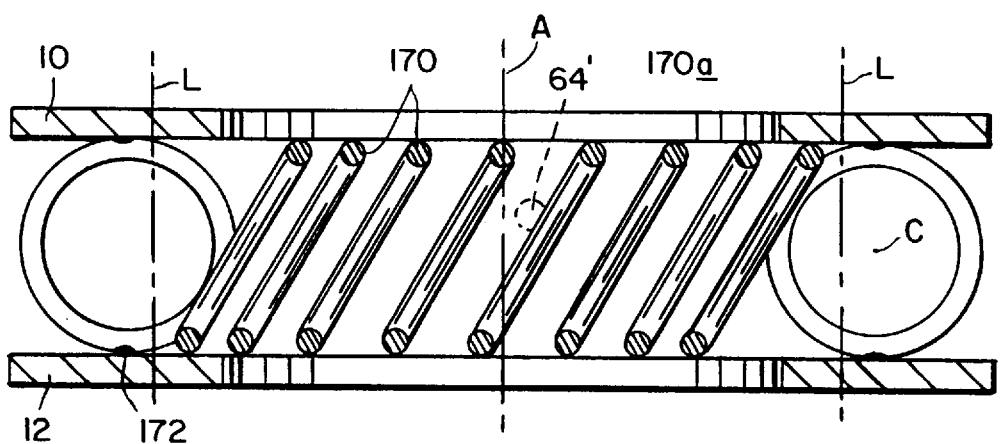
FIG. 8B is a sectional view on a larger scale taken along line 8B—8B of FIG. 8

In some applications, it may not be necessary that the transmission transmit appreciable power; in other words, it might be used as a motion transmission device. In that event, the stator assembly may have a somewhat different form illustrated in FIGS. 8A and 8B. More particularly, the stator ribs may be fabricated from a wire coil 170 folded about an axis A to form a torus. After the coil ends are connected together so that the wire follows an endless helical path which encircles axis A, the coil is sandwiched between the parallel mounting plates 10 and 12. The plates may then be secured to the top and bottom of the coil by welds 172 or other suitable means. Following that, the coil convolutions may be cut along a cylindrical cut-line L centered on the coil axis A as shown in FIG. 8B to form individual helical stator ribs similar to ribs 14 described above.

The wire used in this stator embodiment may have a rectangular or circular cross section. In the latter event, the rotor drive rollers or teeth should have a complementary "pinched" shape as shown at 64' in FIG. 8B.

When provided with an input worm and an output shaft and rotors similar to those described above, the stator assembly depicted in FIGS. 8A and 8B will operate in more or less the same manner as the transmission depicted in FIG. 2.

It with thus be seen that the objects set forth above, among those made apparent from the preceding description, are efficiently attained. Also, certain changes may be made in carrying out the above method and in the constructions set forth without departing from the scope of the invention.

For example, when producing relatively small transmissions of the fully enclosed, lubricated type, the rotors 48 may be made more inexpensively using specially shaped, non-rotating teeth or fingers that engage in the stator races 72. These teeth, one of which is shown at 62' at the right side of FIG. 5 have a cross section which is basically a square with rounded corners. This shape enables the build-up of an oil wedge between the teeth and the rib surfaces 14c when the rotors are revolved, allowing the teeth to "aqua-plane" along the surfaces 14c with minimum friction.

Such rotor elements may be cast or forged to the correct shape with surface properties that are particularly suitable for the lubricant being used to achieve optimal performance. The lift body teeth 62' may be uniquely shaped in accordance with the varying lead angles of the toroidal working surfaces 14c and those of the worm 43 in order to be in conformance with the three-dimensional shape requirements of the toroidal kinematic paths of the teeth. These teeth 62' may also differ in their configuration for each different transmission reduction ratio and toroidal design. In other words, the teeth 62' should be machined to the precise shape to suit the particular transmission requirements using a suitable programmable grinding/polishing tool.

Therefore, it is intended that all matter contained in the above description or shown in the accompanying drawings shall be interpreted as illustrative and not in a limiting sense.

It is also to be understood that the following claims are intended to cover all of the generic and specific features of the invention described herein.

I claim:

1. A toroidal transmission of the type including a stator having a plurality of helical stator races that together define a toroidal cavity having an axis, first and second shafts rotatable about said axis, the first shaft carrying a worm, the second shaft carrying a plurality of multiple-tooth rotors arranged in a circle about said axis so that the rotor teeth facing toward the axis drivingly engage the worm and the rotor teeth facing away from the axis extend into said cavity and drivingly engage said races, the improvement wherein the stator races are bottomless.

2. The transmission defined in claim 1 wherein the transmission includes a first mounting plate having an opening therein receiving the first shaft, a second mounting plate having an opening therein receiving the second shaft, said plates being positioned on opposite sides of the rotors perpendicular to said axis and the stator comprises a circular array of individual arcuate twisted ribs spaced apart about said axis so as to form an open cage-like structure, each rib having one end connected to the first plate and its other end connected to the second plate so that portions of the away-facing rotor teeth project into the spaces between the ribs, said spaces thus constituting the stator races.

3. The transmission defined in claim 2 wherein each rib has a first locating surface adjacent one end thereof, and a second locating surface adjacent the opposite end thereof.

4. The transmission defined in claim 2 wherein the ribs are formed with smooth precision working surfaces at the opposite sides of the ribs and which define the spaces between the ribs.

5. The transmission defined in claim 2 and further including locating means disposed in a circle about said axis on the opposing surfaces of the first and second mounting plates for locating the corresponding ends of the ribs.

6. The transmission defined in claim 5 wherein the locating means on each plate include interfitting means which interfit with the ends of the ribs connected to each plate.

7. The transmission defined in claim 6 wherein the interfitting means include radial keys or keyways.

8. The transmission defined in claim 6 wherein the interfitting means include dowel pins or holes.

9. The transmission defined in claim 2 wherein the rotor teeth are shaped to accommodate the varying lead angles of the worm and the rib working surfaces.

10. The transmission defined in claim 9 wherein the rotor teeth have transverse cross sections that are square with rounded corners.

11. The transmission defined in claim 2 wherein said rotor teeth portions are constituted by rollers.

12. The transmission defined in claim 2 and further including a fluid tight enclosure extending between said plates and surrounding the stator ribs.

13. The transmission defined in claim 12 and further including a fluid lubricant at least partially filling said enclosure.

14. The transmission defined in claim 1 wherein the stator races are produced by coiling wire into a coil having opposite ends and multiple convolutions between said ends, folding the wire coil about an axis into a torus and connecting said opposite ends so that the wire follows an endless helical path which encircles said axis, mounting the folded coil between a pair of parallel plates extending perpendicular to said axis, removing segments of the coil convolutions facing said axis by cutting the folded coil along a generally cylindrical cut-line centered on said axis so as to form a circular array of individual arcuate ribs spaced apart about said axis, the spaces between the ribs constituting said stator races.

15. The transmission defined in claim 14 wherein said wire has a round cross section.

16. The transmission defined in claim 14 wherein said wire has a square or rectangular cross section.

17. A method of making a toroidal transmission comprising coiling wire into a coil having opposite ends and multiple convolutions between said ends;

folding the wire coil about and axis into a torus and connecting said opposite ends so that the wire follows an endless helical path which encircles said axis;

mounting the folded coil between a pair of parallel plates extending perpendicular to said axis;

removing segments of the coil convolutions facing said axis by cutting the folded coil along a generally cylindrical cut-line centered on said axis so as to form a circular array of individual arcuate ribs spaced apart about said axis, and mounting input and output shafts and at least one rotor between said plates so that said at least one rotor engages said wire.

18. A method of assembling a toroidal power transmission of the type including a stator having a plurality of helical races, first and second shafts, the first shaft carrying a worm, and a plurality of multiple-tooth rotors rotatably mounted to the second shaft, said method comprising the steps of rotatably mounting the first shaft to the second shaft so that the two shafts can rotate relatively about an axis;

rotatably mounting the rotors to the second shaft in a circle about said axis so that rotor teeth facing said axis drivingly engage the worm and the rotor teeth facing away from said axis are exposed;

rotatably mounting the shafts to a pair of spaced-apart parallel plates which bracket the worm and rotors and extend perpendicular to said axis, and connecting a set of individual arcuate, helically twisted ribs between said mounting plates to form an open cage-like structure around the rotors that defines a toroidal rotor-receiving cavity centered on said axis, the openings between the ribs constituting helical stator races for receiving said away facing rotor teeth.

19. Apparatus for making a toroidal transmission of the type having a stator assembly composed of many individual arcuate ribs arranged about an axis and sandwiched between a pair of parallel plates so as to define a toroidal cavity having a circular axis that lies perpendicular to said axis and helical stator races between said ribs which are centered on said circular axis and which encircle said axis, said apparatus comprising a turntable rotatable about an axis;

means for releasably mounting said assembly on the turntable so that the cavity axis coincides with the turntable axis;

motive means for rotating the turntable;

a grinding or polishing tool having a working end;

a tool support juxtaposed to the turntable for fixing the position of the tool within an assembly mounted to the turntable so that the working end of the tool extends between said ribs and engage a surface thereof, said tool support including means for pivotally mounting the tool to the tool support so that the tool can pivot about an axis that coincides with said circular axis;

a motor for pivoting said tool on the support, and means for controlling the motive means and the motor in unison so that the working end of the tool follows a precise helical path while engaging said rib surface.

* * * * *